(12) United States Patent
Winston et al.

(10) Patent No.: US 11,246,210 B2
(45) Date of Patent: Feb. 8, 2022

(54) LASER WAKE-FIELD ACCELERATION (LWFA)-BASED NUCLEAR FISSION SYSTEM AND RELATED TECHNIQUES

(71) Applicants: Steven J. Winston, Idaho Falls, ID (US); CONTINUUM ENERGY TECHNOLOGIES, LLC, Fall River, MA (US)

(72) Inventors: Steven J. Winston, Idaho Falls, ID (US); John T. Preston, Hingham, MA (US)

(73) Assignee: IRON OAK LLC, North Brunswick, NJ (US)

(*) Notice: Subject to any disclaimer, the term of this patent is extended or adjusted under 35 U.S.C. 154(b) by 24 days.

(21) Appl. No.: 16/717,402

(22) Filed: Dec. 17, 2019

(65) Prior Publication Data

US 2020/0196431 A1    Jun. 18, 2020

Related U.S. Application Data

(60) Provisional application No. 62/780,628, filed on Dec. 17, 2018.

(51) Int. Cl.
| | | |
|---|---|---|
| *H05H 15/00* | (2006.01) | |
| *G21C 1/02* | (2006.01) | |
| *G21K 5/04* | (2006.01) | |

(52) U.S. Cl.
CPC .............. *H05H 15/00* (2013.01); *G21C 1/02* (2013.01); *G21K 5/04* (2013.01); *G21K 2201/068* (2013.01)

(58) Field of Classification Search
CPC . H05H 1/54; H05H 15/00; H05H 1/24; G21C 1/02; G21C 1/04; G21C 1/28;
(Continued)

(56) References Cited

U.S. PATENT DOCUMENTS 3,860,482 A * 1/1975 Wheelock ................ G21C 7/22
                                                        376/219
10,438,705 B2 * 10/2019 Cheatham, III ......... G21C 1/03
(Continued)

OTHER PUBLICATIONS

Reed et al., Applied physics letters 89, 231107 (Dec. 5, 2006) (Year: 2006).*

(Continued)

*Primary Examiner* — Abdullah A Riyami
*Assistant Examiner* — Syed M Kaiser
(74) *Attorney, Agent, or Firm* — Hayes Soloway PC

(57) ABSTRACT

A laser wake-field acceleration (LWFA)-based nuclear fission system and related techniques are disclosed. In accordance with some embodiments, the disclosed system may be configured to accelerate charged particles, such as protons, to velocities close to the speed of light utilizing LWFA. The system also may be configured, in accordance with some embodiments, to use these high-energy relativistic charged particles in causing nuclear fission of a given downstream fissionable target, thereby releasing large amounts of harvestable energy. Optionally, the system further may be configured, in accordance with some embodiments, to utilize charged particles resulting from the fission in producing electrical energy.

28 Claims, 2 Drawing Sheets

(58) Field of Classification Search
CPC ... G21C 1/30; H01S 3/09; G21K 5/04; G21K 2201/068; G21G 1/001; G21G 1/10; H01J 37/02; H01J 37/32009; H01J 37/32211
See application file for complete search history.

(56) References Cited

U.S. PATENT DOCUMENTS

| | | | | |
|---|---|---|---|---|
| 2003/0183774 | A1* | 10/2003 | Tajima | H05H 7/16 250/423 P |
| 2006/0145088 | A1* | 7/2006 | Ma | G21K 5/04 250/396 ML |
| 2007/0064859 | A1* | 3/2007 | Bokov | G21C 1/30 376/194 |
| 2011/0164720 | A1* | 7/2011 | Takeda | G21C 3/328 376/347 |
| 2011/0261919 | A1* | 10/2011 | Sefcik | G21B 1/23 376/152 |
| 2012/0080618 | A1* | 4/2012 | Clayton | H05H 15/00 250/492.3 |
| 2013/0028364 | A1* | 1/2013 | Rubbia | G21C 17/104 376/215 |
| 2015/0098544 | A1* | 4/2015 | Blanovsky | G21G 1/06 376/246 |
| 2017/0368373 | A1* | 12/2017 | Sahadevan | A61N 5/1067 |
| 2018/0294617 | A1* | 10/2018 | Mills | F03G 3/00 |
| 2019/0066859 | A1* | 2/2019 | De Jager | G21G 1/12 |
| 2019/0239332 | A1* | 8/2019 | Hidding | H05H 1/46 |

OTHER PUBLICATIONS

S. Assadi, "Accelerator-Driven Subcritical Fission To Destroy Transuranics and Close the Nuclear Fuel CYCL"—Texas A&M University (Year: 2013).*
Nuclear charge dispersion of light-mass fission products in the fission of 235U and 238U by medium-energy protons, A. H. Khan (Year: 1969).*
Physical Review Letters, T. Alber, 'vol. 75, No. 21, (Year: 1995).*
Fission fragment angular distribution and fission cross section validation—Lou Sai Leong (Year: 2014).*

* cited by examiner

LASER WAKE-FIELD ACCELERATION (LWFA)-BASED NUCLEAR FISSION SYSTEM AND RELATED TECHNIQUES

CROSS-REFERENCE TO RELATED APPLICATIONS

This patent application claims the benefit of U.S. Provisional Patent Application No. 62/780,628, titled "Laser Wake-Field Acceleration (LWFA)-Based Nuclear Fission System and Related Techniques," filed on Dec. 17, 2018, which is herein incorporated by reference in its entirety.

FIELD OF THE DISCLOSURE

The present disclosure relates to nuclear fission systems and techniques and, more particularly, to laser wake-field acceleration (LWFA)-based nuclear fission systems and techniques.

BACKGROUND

According to relativity, as a particle approaches the speed of light, its mass increases, approaching infinity. In the case of a proton (e.g., a hydrogen nucleus), the proton becomes "fat," greatly increasing the probability of a collision with another particle, such as the nucleus of another atom. When a nucleus is struck by a proton moving at such high velocities, the nucleus is smashed into small particles. This releases the energy of the nucleus, as well as creates sub-atomic particles normally having short half-lives. The amount of energy released in each reaction can be extremely large.

SUMMARY

The subject matter of this application may involve, in some cases, interrelated products, alternative solutions to a particular problem, and/or a plurality of different uses of a single system or article.

One example embodiment provides a system. The system includes a laser wake-field accelerator including: at least one laser source configured to produce a laser beam; and a plasma source configured to produce a plasma; wherein the laser wake-field accelerator is configured to direct the laser beam to be incident with the plasma to produce a charged particle beam. The system further includes an energy collector configured to collect energy released from fission of a fissionable target struck by the charged particle beam. In some cases, the charged particle beam is a proton beam. In some cases, the charged particle beam has an energy in a GeV range. In some cases, the energy collector is configured to utilize a magneto-hydrodynamic technique in collecting energy released from the fission. In some cases, the system further includes an electrical energy generator configured to generate electrical energy utilizing charged particles resulting from the fission. In some such instances, the electrical energy generator includes a magnetic structure through which the charged particles pass so as to generate electrical energy. In some cases, the fissionable target includes either a fissile material or a fertile material. In some cases, the fissionable target includes a heavy metal. In some such instances, the fissionable target includes lead (Pb). In some cases, the fissionable target is of a material composition having a k-effective in the range of about 0.05-0.2. In some cases, the fissionable target is of a material composition having a k-effective of about 0.2 or less.

Another example embodiment provides a method of harvesting energy from a fission reaction. The method includes generating at least one laser beam. The method further includes delivering at least one laser beam to a plasma so as to generate, via laser wake-field acceleration, a charged particle beam. The method further includes delivering the charged particle beam to a fissionable target so as to cause fission thereof. The method further includes collecting energy released from the fission of the fissionable target. In some cases, the charged particle beam is a proton beam. In some cases, the charged particle beam has an energy in a GeV range. In some cases, the at least one laser beam is generated by at least one laser source of a laser wake-field accelerator. In some cases, collecting energy released from the fission of the fissionable target is performed, at least in part, utilizing at least one energy collector. In some such instances, the energy collector is configured to utilize a magneto-hydrodynamic technique in collecting energy released from the fission. In some cases, the method further includes generating electrical energy utilizing charged particles resulting from the fission. In some such instances, generating electrical energy is performed, at least in part, utilizing an electrical energy generator. In some such instances, the electrical energy generator includes a magnetic structure through which the charged particles pass so as to generate electrical energy. In some cases, the fissionable target includes either a fissile material or a fertile material. In some cases, the fissionable target includes a heavy metal. In some such instances, the fissionable target includes lead (Pb). In some cases, the fissionable target is of a material composition having a k-effective in the range of about 0.05-0.2. In some cases, the fissionable target is of a material composition having a k-effective of about 0.2 or less.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
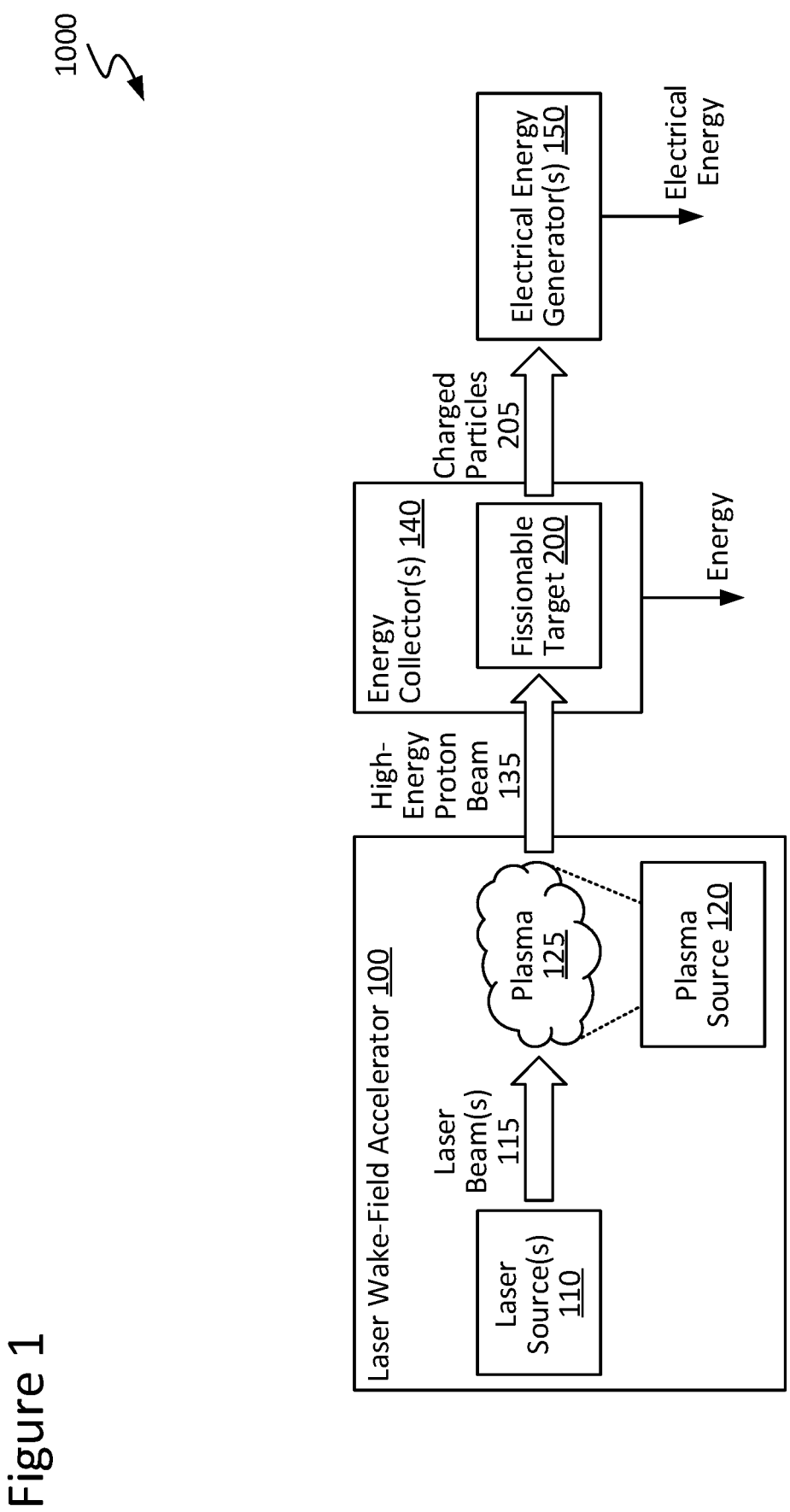
FIG. 1 is a block diagram illustrating a fission reaction system configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A laser wake-field acceleration (LWFA)-based nuclear fission system and related techniques are disclosed. In accordance with some embodiments, the disclosed system may be configured to accelerate charged particles, such as protons, to velocities close to the speed of light utilizing LWFA. The system also may be configured, in accordance with some embodiments, to use these high-energy relativistic charged particles in causing nuclear fission of a given downstream fissionable target, thereby releasing large amounts of harvestable energy. Optionally, the system further may be configured, in accordance with some embodiments, to utilize charged particles resulting from the fission in producing electrical energy. Numerous configurations and variations will be apparent in light of this disclosure.

General Overview

Laser wake-fields are created by interference patterns between laser beams. The interference can be engineered through lensing and other techniques to create significant localized amplification of the energy of a light wave, like the amplification of the interference between waves on a pond created by tossing two stones in the water. The waves interfere both constructively (creating higher peaks) and destructively (creating deeper valleys). Generally, laser wake-field accelerator (LWFA) technology may enable low-energy lasers to be used to accelerate a charged particle to velocities approaching the speed of light (e.g., about 0.99 times the speed of light). Thus, with LWFA, charged particles, such as protons, electrons, and ions, can be accelerated to near the speed of light at a very low cost, with very low energy requirements.

Thus, and in accordance with some embodiments of the present disclosure, a laser wake-field acceleration (LWFA)-based nuclear fission system and related techniques are disclosed. In accordance with some embodiments, the disclosed system may be configured to accelerate charged particles, such as protons, to velocities close to the speed of light utilizing LWFA. The system also may be configured, in accordance with some embodiments, to use these high-energy relativistic charged particles in causing nuclear fission of a given downstream fissionable target, thereby releasing large amounts of harvestable energy. Optionally, the system further may be configured, in accordance with some embodiments, to utilize charged particles resulting from the fission in producing electrical energy.

In accordance with some embodiments, the disclosed system may include a laser wake-field accelerator including one or more laser sources and a plasma source. The laser source(s) may be configured to output one or more laser beams that, when incident with the plasma produced by the plasma source, generate a high-energy proton (or other charged particle) beam. In turn, the high-energy proton (or other charged particle) beam may be directed to strike a downstream fissionable target to cause fission thereof. The fissionable target may be any of a wide range of fissionable materials and is not intended to be limited only to fissile or fertile materials. For instance, in some example cases, the fissionable target may be (or otherwise may include) a metal, such as lead (Pb), iron (Fe), tin (Sn), or copper (Cu), a heavy metal, an alloy, or a metallic compound. The disclosed system further may include, in accordance with some embodiments, one or more energy collectors configured to collect energy released from the fission of the fissionable target. Optionally, the disclosed system further may include, in accordance with some embodiments, one or more electrical energy generators configured to generate electrical energy utilizing charged particles released from the fission.

As will be appreciated in light of this disclosure, techniques disclosed herein may provide for a clean and safe method of producing controlled nuclear fission. As previously noted, large amounts of energy can be released utilizing the disclosed system. In striking the fissionable target, if the energy level of an incident proton is sufficiently high, the energy for one fission could be, for instance, up to 20,000 times higher than the energy released by traditional $^{235}$U fission because not only the binding energy per nucleon is released, but also the mass energy of the protons and neutrons. In an example case in which the fissionable target is lead (Pb), the energy release for fission of one atom of $^{207}$Pb utilizing techniques disclosed herein could be about $1.94 \times 10^5$ MeV, which is more than 22,000 times greater than the energy release for fission of $^{235}$U at about 8.5 MeV. Therefore, in an example case of utilizing about 6 tons of $^{207}$Pb as a fissionable target, the energy released would be approximately equal to the entire amount of energy used by humankind in one calendar year. The energy output per atom is so high that only a tiny amount of fissionable material may be required as fuel for the disclosed system. Thus, as will be further appreciated in light of this disclosure, the disclosed system may be utilized in any of a wide range of contexts and applications, including being employed as a lightweight, low-cost nuclear fuel source for planes, ships, and other vehicles, as well as for stationary power generation, in accordance with some embodiments. In some cases, the disclosed system may be configured to be utilized, for example, as or in a space propulsion system.

Traditional fission reactors operate under conditions close to those of a runaway reaction (e.g., k-effective of about 1.0). The control systems at existing nuclear power plants including such reactors must manage the complexity of operating near this limit, and most accidents result from a breakdown in the control systems. A system provided as described herein, however, may be configured to stop the fission reaction instantly when the flux of high-energy protons (or other charged particles) is turned off. Also, at least in some instances, the fissionable target may be of a material composition (e.g., lead) that will not sustain any reaction in the absence of the high-energy protons (or other charged particles). Therefore, use of techniques disclosed herein may provide for substantial control over the rate of fission reaction, enhancing overall safety as compared to existing fission approaches, in accordance with some embodiments.

In contrast to traditional reactor systems, the disclosed system may be configured to produce fission of fissionable materials not traditionally considered fissile or fertile. Therefore, in at least some instances, the disclosed system may provide for an advantage in the ease of fuel handling, as well as the avoidance of using hazardous materials and the associated permits needed to handle such materials. Also, unlike with traditional fission techniques, the particles generated by using techniques disclosed herein may have short half-lives (e.g., well less than 1 sec), enabling more complete harvesting of the energy and avoiding generation of hazardous radioactive fission products.

In at least some cases, a system configured as described herein may be provided with relatively low capital cost as compared to existing power generation systems. Moreover, depending on the selected fissionable target material, fuel for the disclosed system may be essentially free (or otherwise very low-cost). In accordance with some embodiments, the disclosed system may be scalable in size while remaining economic, even with energy output in the kilowatt range. Contrariwise, existing fission reactors are economic only in sizes near 1 GW.

In at least some instances, LWFA provided as described herein may be utilized in provision of a bombardment source of variable energy and/or variable particle(s) or, more generally, as a means of providing bremsstrahlung (e.g., braking radiation). Thus, when using protons, for example, at very high energies for impacting a fissionable target of a given configuration, use of techniques described herein may result in annihilation reaction(s). At somewhat lower particles velocities (energies), the Coulomb barrier may not be sufficient to impede charged particle access to the nucleus. At least in some instances, the principal destabilization of nuclei of the fissionable target may be (in part or in whole) the imparted or absorbed kinetic energy. In some cases, resonance may be relevant and calculable in a μ-charge context. For instance, in some cases, it may be desirable to be anti-resonant to maximize (or otherwise improve) kinetic effect, such as if μ-charge predicts a fat, transverse-flat probability density function of charged particles.

System Architecture and Operation

FIG. 1 is a block diagram illustrating a fission reaction system 1000 configured in accordance with an embodiment of the present disclosure. As can be seen, system 1000 may include (or otherwise may involve in its operation) a laser wake-field accelerator 100, one or more energy collectors 140, and (optionally) one or more electrical energy generators 150. Laser wake-field accelerator 100 may include (or otherwise may involve in its operation) one or more laser sources 110 and a plasma source 120. As can be seen further, a fissionable target 200 may be operated upon by system 1000 so as to cause fission thereof. Each of these various elements is discussed in turn below. More generally, FIG. 1 illustrates the relationships of the various constituent elements of system 1000 and the overall flow of energy within and from system 1000, in accordance with some embodiments. In a general sense, system 1000 may be considered, in part or in whole, a nuclear fission reactor.

As previously noted, system 1000 may include a laser wake-field accelerator 100 configured to provide system 1000 with laser wake-field acceleration (LWFA) capabilities, which optionally may be self-modulated LWFA (SMLWFA). To that end, accelerator 100 may include one or more laser sources 110 and a plasma source 120. In accordance with some embodiments, a given laser source 110 may be configured to output a laser beam 115 that, when incident with a plasma 125 produced by plasma source 120, generates a high-energy proton beam 135 therefrom. It should be noted, however, that the present disclosure is not intended to be limited only to generating a high-energy proton beam 135, as in a more general sense, and in accordance with some embodiments, system 1000 may be configured to produce a high-energy charged particle beam, which may include protons, electrons, or ions, as the case may be. The angle of incidence (e.g., strike angle), as well as the spread (e.g., tight, broad, patterned, locally condensed, etc.) and uniformity or gradient, of proton beam 135 (or other charged particle beam) may be customized, as desired for a given target application or end-use. To such ends, the characteristics of a given laser beam 115 and of plasma 125, as well as the configuration and arrangement of a given laser source 110 and plasma source 120, may be customized, as desired for a given target application or end-use.

In some cases, a given laser source 110 may be configured for continuous wave (CW) output. In some cases, a given laser source 110 may be configured for pulsed or otherwise intermittent or interrupted output. In some cases, a given laser source 110 may be configured as a diode-based laser involving one or more light-emitting diodes (LEDs) or other semiconductor-based electromagnetic radiation emitters. Regarding plasma 125, the specific gas or blend of gases may be customized, as desired for a given target application or end-use.

Also, as previously noted, proton beam 135 (or other charged particle beam) may be directed to strike a downstream fissionable target 200 to produce fission thereof, in accordance with some embodiments. To that end, fissionable target 200 may be composed, in part or in whole, of any material capable of undergoing fission when struck by proton beam 135 (or other charged particle beam). In some cases, fissionable target 200 may include, in part or in whole, a fissile material, as traditionally characterized. Examples may include $^{235}$U, $^{233}$U, $^{239}$Pu, and $^{241}$Pu. Enriched (e.g., low-enriched) and unenriched fissile materials alike may be utilized. In some cases, fissionable target 200 may include, in part or in whole, a fertile material, as traditionally characterized. Examples may include $^{238}$U, $^{240}$Pu, and $^{232}$Th. In some cases, fissionable target 200 may include, in part or in whole, a material that is not traditionally characterized as fissile or fertile. Examples may include metals such as lead (Pb), iron (Fe), tin (Sn), or copper (Cu), among others. In some cases, fissionable target 200 may include a material characterized as a heavy metal (e.g., a metallic element having a density of about 5 g/cm$^3$ or greater). In some instances, fissionable target 200 may include an alloy or a metallic compound.

At least in some instances, fissionable target 200 may be of such material composition that it has a k-effective in the range of about 0.05-0.2 (e.g., a subcritical k-effective). At least in some instances, fissionable target 200 may be of such material composition that it has a k-effective of about 0.2 or less (e.g., about 0.18 or less, about 0.15 or less, about 0.12 or less, about 0.1 or less, about 0.08 or less, about 0.05 or less, or any other sub-range in the range of about 0.2 or less). In some instances, fissionable target 200 may be of such material composition that it has a k-effective of about 1.0 or less (e.g., about 0.8 or less, about 0.6 or less, about 0.4 or less, or any other sub-range in the range of about 1.0 or less). In at least some cases, the k-effective of fissionable target 200 may be, in a general sense, irrelevant to operation of system 1000 or utilization of techniques disclosed herein. Other suitable fissionable materials 200 and associated k-effective ranges will depend on a given target application or end-use and will be apparent in light of this disclosure.

In accordance with some embodiments, proton beam 135 (or other charged particle beam) may strike fissionable target 200 with an energy in the GeV range, though other energy ranges may be provided, if desired. The impact of proton beam 135 (or other charged particle beam) may shatter protons and electrons of fissionable target 200, releasing energy and leaving behind the dust of any impacted particle(s). As will be appreciated in light of this disclosure, the energy so released by fissionable target 200 may be quite high. For example, the energy released in the fission of lead (Pb) may be about 22,000 times greater than the energy released in the typical breakdown of $^{235}$U. Thus, in accordance with some embodiments, system 1000 may include one or more energy collectors 140 configured to collect (e.g., harvest) energy released from the fission. To that end, the configuration and arrangement of a given energy collector 140 may be customized, as desired for a given target application or end-use. In some instances, a given energy collector 140 may utilize magneto-hydrodynamic techniques in collecting the energy released from the fission. In some cases, a given energy collector 140 may be configured to collect the energy as it is released, eliminating or otherwise reducing potential heat problems for system 1000. Other suitable options for collecting energy with system 1000 will depend on a given target application or end-use and will be apparent in light of this disclosure.

As will be appreciated in light of this disclosure, the fission of fissionable material 200 may result in various charged particles 205 being released. Thus, in accordance with some embodiments, system 1000 optionally may include one or more electrical energy generators 150 configured to generate electrical energy from such charged particles 205. To that end, the configuration and arrangement of a given electrical energy generator 150 may be customized, as desired for a given target application or end-use. In some instances, a given electrical energy generator 150 may include a magnetic tube (or other suitable structure) through which charged particles 205 may pass, generating electrical energy via the Faraday effect. Other suitable options for generating electrical energy with system 1000 will depend on a given target application or end-use and will be apparent in light of this disclosure.

Methodology

Figure 2:
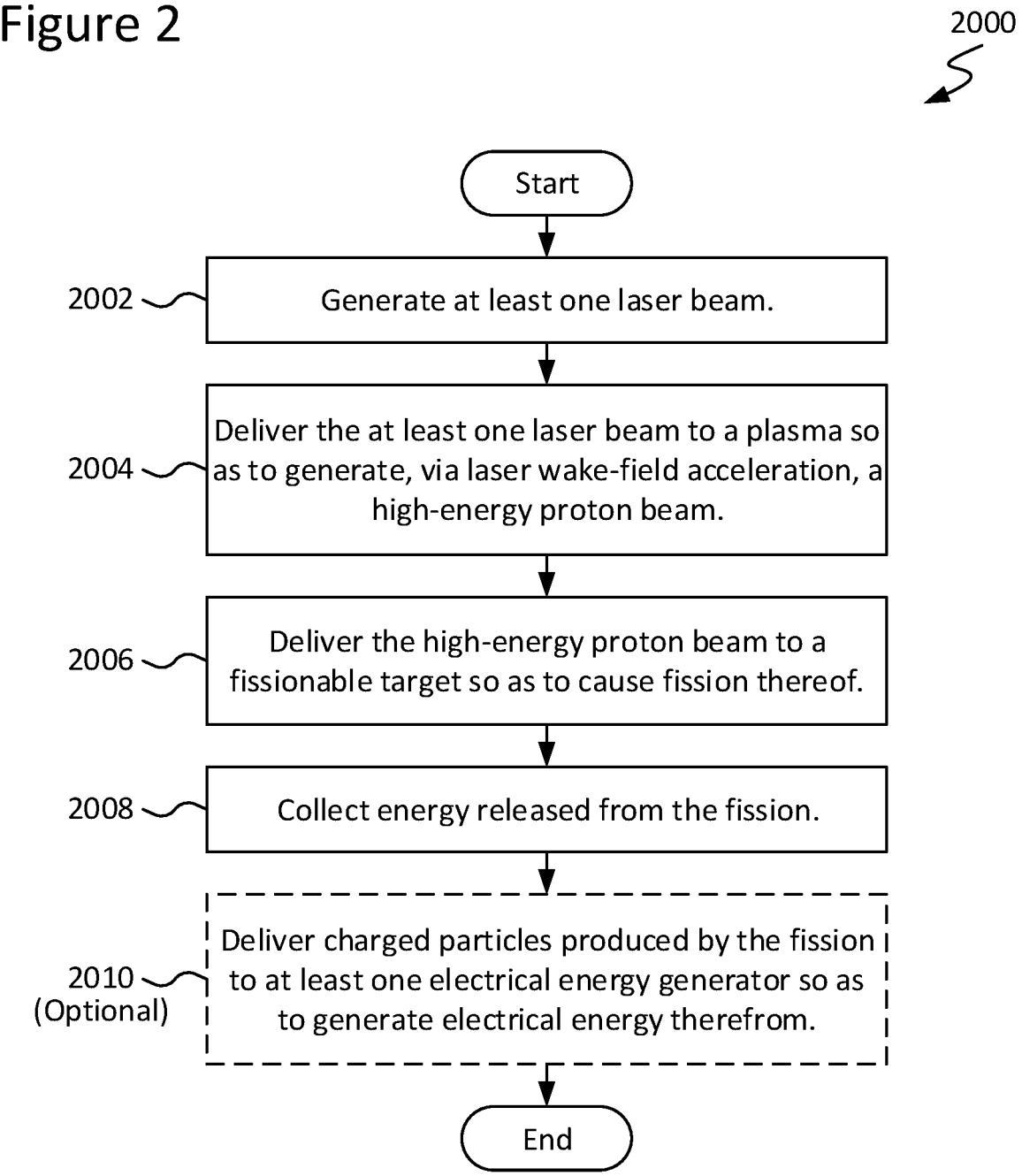
FIG. 2 is a flow chart illustrating a method of harvesting energy from a fission reaction, in accordance with an embodiment of the present disclosure.

FIG. 2 is a flow chart illustrating a method 2000 of harvesting energy from a fission reaction, in accordance with an embodiment of the present disclosure. As can be seen, method 2000 may begin as in block 2002 with generating at least one laser beam. In accordance with some embodiments, a given laser beam 115 may be generated by a given laser source 110 of a laser wake-field accelerator 100, as discussed herein.

Method 2000 may continue as in block 2004 with delivering the at least one laser beam to a plasma so as to generate, via laser wake-field acceleration, a high-energy proton beam. In accordance with some embodiments, a laser beam 115 provided by a given laser source 110 may be incident with plasma 125 produced by a plasma source 120 of a laser wake-field accelerator 100, resulting in the output of a high-energy proton beam 135 (or other charged particle beam, as desired), as discussed herein.

Method 2000 may continue as in block 2006 with delivering the high-energy proton beam to a fissionable target so as to cause fission thereof. In accordance with some embodiments, proton beam 135 may be so delivered to a downstream fissionable target 200, as discussed herein.

Method 2000 may continue as in block 2008 with collecting energy released from the fission of fissionable target 200. In accordance with some embodiments, energy collection may be provided, in part or in whole, by one or more energy collectors 140, as discussed herein.

Method 2000 optionally may continue as in block 2010 with delivering charged particles resulting from the fission to at least one electrical energy generator so as to generate electrical energy therefrom. In accordance with some embodiments, electrical energy generation may be provided, in part or in whole, by one or more electrical energy generators 150, as discussed herein.

What is claimed is:

1. A system comprising:
a laser wake-field accelerator comprising:
at least one laser source configured to produce a laser beam; and
a plasma source configured to produce a plasma;
wherein the laser wake-field accelerator is configured to direct the laser beam to be incident with the plasma to produce a charged particle beam; and
an energy collector configured to collect energy released from nuclear fission of a fissionable target struck by the charged particle beam.

2. The system of claim 1, wherein the charged particle beam is a proton beam.

3. The system of claim 1, wherein the charged particle beam has an energy in a GeV range.

4. The system of claim 1, wherein the energy collector is configured to utilize a magneto-hydrodynamic technique in collecting energy released from the nuclear fission.

5. The system of claim 1, further comprising an electrical energy generator configured to generate electrical energy utilizing charged particles resulting from the nuclear fission.

6. The system of claim 5, wherein the electrical energy generator comprises a magnetic structure through which the charged particles pass so as to generate electrical energy.

7. The system of claim 1, wherein the fissionable target comprises a heavy metal.

8. The system of claim 7, wherein the fissionable target comprises lead (Pb).

9. The system of claim 1, wherein the fissionable target comprises either a fissile material or a fertile material and has a k-effective in the range of about 0.05-0.2.

10. The system of claim 1, wherein the fissionable target comprises either a fissile material or a fertile material and has a k-effective of about 0.2 or less.

11. A method of harvesting energy from a nuclear fission reaction, the method comprising:
generating at least one laser beam;
delivering the at least one laser beam to a plasma so as to generate, via laser wake-field acceleration, a charged particle beam;
delivering the charged particle beam to a fissionable target so as to cause nuclear fission thereof; and
collecting energy released from the nuclear fission of the fissionable target.

12. The method of claim 11, wherein the charged particle beam is a proton beam.

13. The method of claim 11, wherein the charged particle beam has an energy in a GeV range.

14. The method of claim 11, wherein the at least one laser beam is generated by at least one laser source of a laser wake-field accelerator.

15. The method of claim 11, wherein collecting energy released from the nuclear fission of the fissionable target is performed, at least in part, utilizing at least one energy collector.

16. The method of claim 15, wherein the energy collector is configured to utilize a magneto-hydrodynamic technique in collecting energy released from the nuclear fission.

17. The method of claim 11, further comprising:
generating electrical energy utilizing charged particles resulting from the nuclear fission.

18. The method of claim 17, wherein generating electrical energy is performed, at least in part, utilizing an electrical energy generator.

19. The method of claim 18, wherein the electrical energy generator comprises a magnetic structure through which the charged particles pass so as to generate electrical energy.

20. The method of claim 11, wherein the fissionable target comprises a heavy metal.

21. The method of claim 20, wherein the fissionable target comprises lead (Pb).

22. The method of claim 11, wherein the fissionable target comprises either a fissile material or a fertile material and has a k-effective in the range of about 0.05-0.2.

23. The method of claim 11, wherein the fissionable target comprises either a fissile material or a fertile material and has a k-effective of about 0.2 or less.

24. The method of claim 11, wherein the nuclear fission is caused by striking of the fissionable target via at least one of an electron, a proton, and an ion of the charged particle beam.

25. The method of claim 11, wherein the charged particle beam is not a gamma radiation or photon beam.

26. The system of claim 1, wherein the nuclear fission is caused by striking of the fissionable target via at least one of an electron, a proton, and an ion of the charged particle beam.

27. The system of claim 1, wherein the charged particle beam is not a gamma radiation or photon beam.

28. A system comprising:
   a laser wake-field accelerator comprising:
      at least one laser source configured to produce a laser beam; and
      a plasma source configured to produce a plasma;
      wherein the laser wake-field accelerator is configured to direct the laser beam to be incident with the plasma to produce a charged particle beam that has an energy in a GeV range; and
   an energy collector configured to collect energy released from nuclear fission of a fissionable target struck by at least one of an electron, a proton, and an ion of the charged particle beam.

\* \* \* \* \*